US011552391B2

(12) United States Patent
Huang

(10) Patent No.: US 11,552,391 B2
(45) Date of Patent: Jan. 10, 2023

(54) MOBILE DEVICE WITH MULTIPLE-ANTENNA SYSTEM

(71) Applicant: Futurewei Technologies, Inc., Plano, TX (US)

(72) Inventor: Wei Huang, San Diego, CA (US)

(73) Assignee: Futurewei Technologies, Inc., Addison, TX (US)

( * ) Notice: Subject to any disclaimer, the term of this patent is extended or adjusted under 35 U.S.C. 154(b) by 47 days.

(21) Appl. No.: 15/868,958

(22) Filed: Jan. 11, 2018

(65) Prior Publication Data

US 2018/0205146 A1  Jul. 19, 2018

Related U.S. Application Data

(60) Provisional application No. 62/446,173, filed on Jan. 13, 2017.

(51) Int. Cl.
*H01Q 1/52* (2006.01)
*H01Q 21/24* (2006.01)
(Continued)

(52) U.S. Cl.
CPC .......... *H01Q 1/523* (2013.01); *H01Q 1/2258* (2013.01); *H01Q 1/243* (2013.01); *H01Q 1/48* (2013.01);
(Continued)

(58) Field of Classification Search
CPC ...... H01Q 13/10; H01Q 21/064; H01Q 21/24; H01Q 1/523; H01Q 1/2258; H01Q 1/243;
(Continued)

(56) References Cited

U.S. PATENT DOCUMENTS 10,069,194 B2 * 9/2018 Cai .................. H01Q 1/243
2008/0198082 A1 8/2008 Soler et al.
(Continued)

FOREIGN PATENT DOCUMENTS

CN 2505992 Y 8/2002
CN 1672290 A 9/2005
(Continued)

OTHER PUBLICATIONS

Zhang, S. and Pedersen, G., "Mutual Coupling Reduction for UWB MIMO Antennas With a Wideband Neutralization Line," IEEE Antennas and Wireless Propagation Letters 15:166-9 (2016).
(Continued)

*Primary Examiner* — Robert Karacsony
(74) *Attorney, Agent, or Firm* — Schwegman Lundberg & Woessner, P.A.

(57) ABSTRACT

Embodiments provide mobile device comprising a body frame; processing circuitry affixed to the body frame; a first antenna and a second antenna arranged adjacent to each other in the body frame, the first antenna and the second antenna electrically coupled to the processing circuitry to provide radiation, wherein the first antenna and the second antenna share a common ground defined by the body frame, wherein the first antenna is configured to provide radiation of a first polarization, and wherein the second antenna is configured to provide radiation of a second polarization substantially orthogonal to the first polarization to provide a signal isolation between the first antenna and the second antenna.

17 Claims, 6 Drawing Sheets

(51) Int. Cl.
*H01Q 21/28* (2006.01)
*H01Q 1/22* (2006.01)
*H01Q 1/24* (2006.01)
*H01Q 1/48* (2006.01)
*H01Q 21/08* (2006.01)
*H01Q 13/10* (2006.01)

(52) U.S. Cl.
CPC ............ *H01Q 1/521* (2013.01); *H01Q 21/08* (2013.01); *H01Q 21/24* (2013.01); *H01Q 21/28* (2013.01); *H01Q 13/10* (2013.01)

(58) Field of Classification Search
CPC .......... H01Q 1/52; H01Q 1/521; H01Q 1/525; H01Q 1/2266; H01Q 1/48; H01Q 13/106; H01Q 13/18; H01Q 21/08; H01Q 21/28; H01Q 13/16
USPC .......................... 343/770, 768, 774, 776, 893
See application file for complete search history.

(56) References Cited

U.S. PATENT DOCUMENTS

| | | | | |
|---|---|---|---|---|
| 2008/0284661 | A1* | 11/2008 | He | H01Q 9/0421 343/700 MS |
| 2011/0163922 | A1 | 7/2011 | Wang et al. | |
| 2011/0215971 | A1 | 9/2011 | Rao | |
| 2012/0009884 | A1* | 1/2012 | Rao | H01Q 1/243 455/73 |
| 2013/0187825 | A1* | 7/2013 | Andujar Linares | H01Q 1/243 343/853 |
| 2014/0184450 | A1* | 7/2014 | Koo | H01Q 5/335 343/702 |
| 2014/0266928 | A1 | 9/2014 | Gummalla | |
| 2016/0126632 | A1 | 5/2016 | Ying | |
| 2016/0315373 | A1* | 10/2016 | Azad | H01Q 1/243 |

FOREIGN PATENT DOCUMENTS

| | | |
|---|---|---|
| CN | 102130383 | 7/2011 |
| CN | 102780065 A | 11/2012 |
| CN | 202712437 U | 1/2013 |
| CN | 103368624 A | 10/2013 |
| CN | 104810622 A | 7/2015 |
| CN | 105140651 A | 12/2015 |
| CN | 106229667 A | 12/2016 |
| EP | 3073566 | 9/2016 |
| EP | 3098903 A1 | 11/2016 |

OTHER PUBLICATIONS

A. Diallo et al., "Study and Reduction of the Mutual Coupling Between Two Mobile Phone PIFAs Operating in the DCS1800 and UMTS Bands," IEEE Transactions on Antennas and Propagation 54(11):3063-74 (2006).

S-W. Su et al., "Printed MIMO-Antenna System Using Neutralization-Line Technique for Wireless USB-Dongle Applications," IEEE Transactions on Antennas and Propagation 60(2):456-63 (2012).

"Chinese Application No. 201880007023.1, First Office Action dated Dec. 18, 2019", (dated Dec. 18, 2019), 20 pgs.

"European Application No. 18739020.8, Extended European Search Report dated Nov. 29, 2019", (dated Nov. 29, 2019), 11 pgs.

"European Application No. 18739020.8, Communication pursuant to Article 94(3) EPC, dated Mar. 26, 2021", (dated Mar. 26, 2021), 7 pgs.

"Chinese Application No. 202111101718, First Office Action dated Jun. 13, 2022", (dated Jun. 13, 2022), 8 pgs.

* cited by examiner

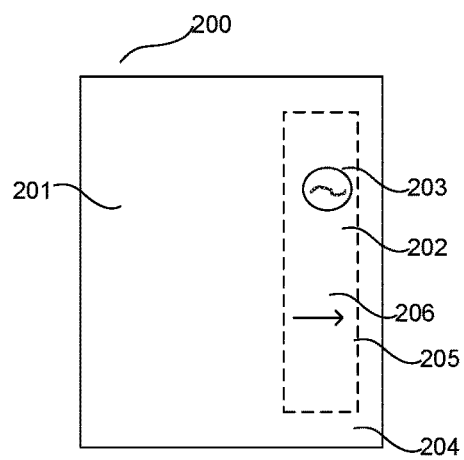
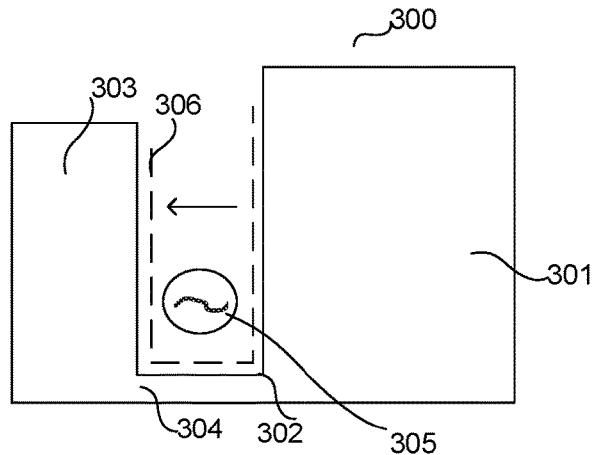
FIG.2            FIG.3
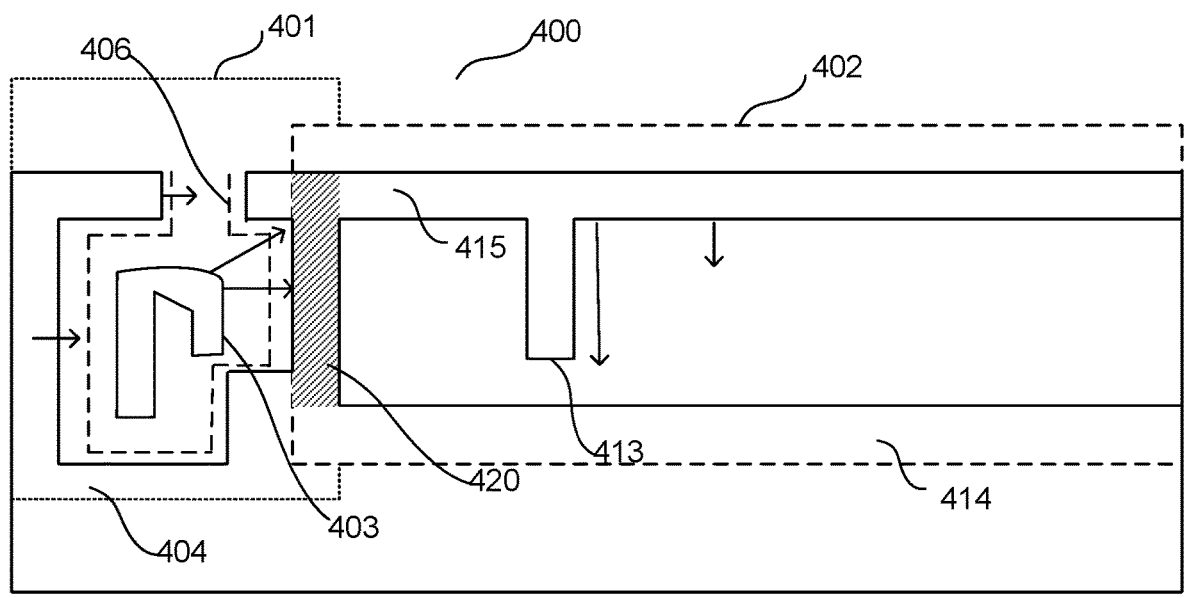
FIG.4

MOBILE DEVICE WITH MULTIPLE-ANTENNA SYSTEM

CROSS-REFERENCE TO RELATED APPLICATION

This patent application claims priority to U.S. Provisional Application No. 62/446,173 filed on Jan. 13, 2017, which is hereby incorporated by reference in its entirety.

TECHNICAL FIELD

The present disclosure is related to devices, and in particular to a mobile device with a multiple-antenna system.

BACKGROUND

Devices communicate with each other exchanging information by transferring signals such as wireless signals. Wireless signals are electromagnetic waves travelling through the air. They are formed when electric energy travels through a piece of metal, for example a wire or antenna, and waves are formed around that piece of metal.

Wireless signals occupy a spectrum or a range of frequencies. A mobile device may be a full duplex wireless communication device, i.e. a mobile device simultaneously transmits and receives signals so that a user can talk and listen at the same time. Usually two different frequencies or frequency bands are used in a mobile device to isolate its transmitter from receiver, one band for transmitting and the other band for receiving.

More and more antennas are needed for a single mobile device to support requirements of complex communications. For example, a mobile phone supports 4×4 LTE MIMO (long term evolution multiple input and multiple output) would need minimal 4 antennas to cover a same frequency spectrum. Good isolation of each antenna is desired for good radio frequency (RF) sensitivity and less jamming on intermodulation.

Though the required number of antennas increases, mobile device is getting slimmer on thickness and its bezel area is getting smaller with its screen-to-body ratio getting bigger. The area left for antennas is extremely limited. How to design multiple antennas within the limited space of a mobile device with good performance becomes a real technical challenge.

SUMMARY

An example embodiment includes a mobile device comprising a body frame; processing circuitry affixed to the body frame; a first antenna and a second antenna arranged adjacent to each other in the body frame, the first antenna and the second antenna electrically coupled to the processing circuitry to provide radiation, wherein the first antenna and the second antenna share a common ground defined by the body frame, wherein the first antenna is configured to provide radiation of a first polarization, and wherein the second antenna is configured to provide radiation of a second polarization substantially orthogonal to the first polarization to provide a signal isolation between the first antenna and the second antenna.

Optionally, in any of the preceding embodiments, wherein the first antenna is configured with a grounding leg connected to the common ground, and the grounding leg is configured to provide grounding support for the second antenna.

Optionally, in any of the preceding embodiments, wherein a part of the body frame is defined for the common ground, and wherein the first antenna is configured with an aperture formed by the part of the body frame.

Optionally, in any of the preceding embodiments, wherein a part of the body frame is defined for the common ground, wherein the first antenna is configured with a first aperture, and part of the first aperture is formed by the part of the body frame.

Optionally, in any of the preceding embodiments, wherein the second antenna is configured with an aperture formed by the part of the body frame.

Optionally, in any of the preceding embodiments, wherein the second antenna is configured with a second aperture, and part of the second aperture is formed by the part of the body frame.

Optionally, in any of the preceding embodiments, wherein a part of the body frame is defined for the common ground, wherein the first antenna is configured with a first aperture, and part of the first aperture is formed by the part of the body frame, the second antenna is configured with a second aperture, and part of the second aperture is formed by the part of the body frame, and wherein the first aperture and the second aperture are distinct from each other.

Optionally, in any of the preceding embodiments, wherein the part of the body frame is defined to separate respective apertures for the first antenna and the second antenna.

Optionally, in any of the preceding embodiments, wherein the first antenna and the second antenna are formed with separate apertures arranged as being substantially coplanar.

Optionally, in any of the preceding embodiments, wherein the body frame comprises a printed circuit board, an integrated chip, a circuit card, a configuration card, a desk top device chassis, a lap top device chassis, a set top device chassis, a back cover or a hand held device chassis.

An example embodiment includes a mobile device comprising a body frame; processing circuitry affixed to the body frame; a plurality of groups of antennas with each group comprising a respective pair of antennas arranged adjacent to each other in the body frame; wherein the respective pair of antennas include a first antenna and a second antenna electrically coupled to the processing circuitry to provide radiation, wherein the first antenna and the second antenna share a common ground defined by the body frame, wherein the first antenna is configured to provide radiation of a first polarization, and wherein the second antenna is configured to provide radiation of a second polarization substantially orthogonal to the first polarization to provide a signal isolation between the first antenna and the second antenna.

Optionally, in any of the preceding embodiments, wherein the first antenna is configured with a grounding leg connected to the common ground, and the grounding leg is configured to provide grounding support for the second antenna.

Optionally, in any of the preceding embodiments, wherein a part of the body frame is defined for the common ground, and wherein the first antenna is configured with an aperture formed by the part of the body frame.

Optionally, in any of the preceding embodiments, wherein the second antenna is configured with an aperture formed by the part of the body frame.

Optionally, in any of the preceding embodiments, wherein a part of the body frame is defined for the common ground, wherein the first antenna is configured with a first aperture, and part of the first aperture is formed by the part of the body frame, the second antenna is configured with a second aperture, and part of the second aperture is formed by the part of the body frame, and wherein the first aperture and the second aperture are distinct from each other.

Optionally, in any of the preceding embodiments, wherein the part of the body frame is defined to separate respective apertures for the first antenna and the second antenna.

Optionally, in any of the preceding embodiments, wherein the first antenna and the second antenna are formed with separate apertures arranged as being substantially coplanar.

Optionally, in any of the preceding embodiments, wherein the body frame comprises a printed circuit board, an integrated chip, a circuit card, a configuration card, a desk top device chassis, a lap top device chassis, a set top device chassis, a back cover or a hand held device chassis.

Optionally, in any of the preceding embodiments, wherein at least one group of antennas comprises a multiple input and multiple output (MIMO) antenna.

Optionally, in any of the preceding embodiments, wherein no more than one group comprising the respective pair of antennas being adjacent to each other is arranged on a same edge side of the body frame.

BRIEF DESCRIPTION OF THE DRAWINGS

Various slides illustrating example embodiments are included in the detailed description.

FIG. 2 illustrates an example geometry structure of a slot antenna 200.

FIG. 3 illustrates an example geometry structure of an Inverted-F Antenna (IFA) 300.

FIG. 4 illustrates an antenna system 400 comprising two adjacent antennas according to an embodiment of the present disclosure.

DETAILED DESCRIPTION

Figure 1:
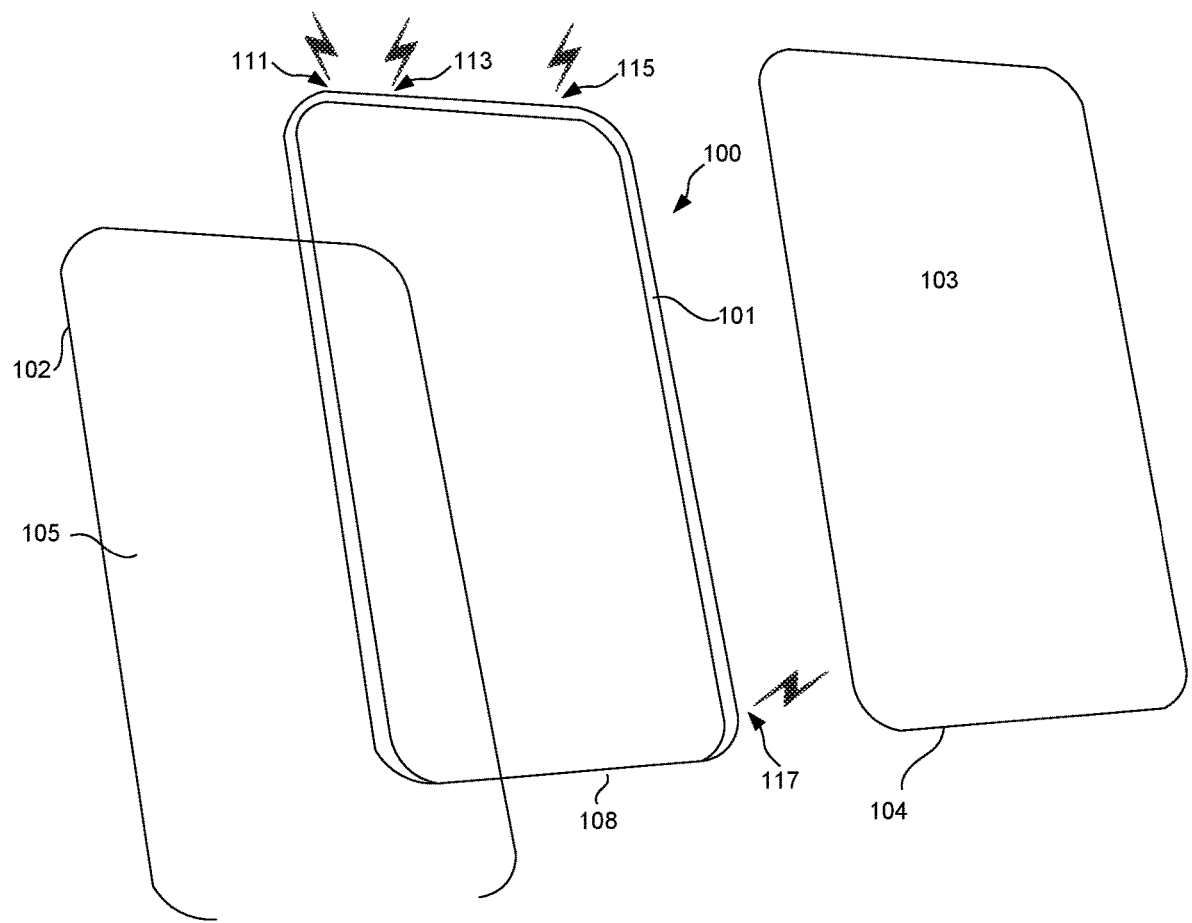
FIG. 1 is a perspective view of an example device 100 equipped with a plurality of antennas in accordance with an embodiment of the present disclosure.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A mobile device may be a device such as a wireless electronic device, mobile phone, mobile pad, laptop computer, wrist-watch device, wearable device, tablet, or Internet of Things (IoT) device etc.

An antenna may include a conductive material that may be configured to radiate and/or receive radio frequency (RF) signals. Multiple antennas are required to make complicate communications for a mobile device. Isolation between antennas is crucial to reduce mutual coupling between antennas so that good radiation performance and transmitting/receiving sensitivity can be achieved. Mutual coupling is an electromagnetic interaction between antennas. A current developed in each antenna element depends on their own excitation as well as the contributions from adjacent antenna elements. A compact multi-antenna system with low mutual coupling applied in a mobile device is big challenge for antenna engineers and highly desired by the industry.

An element of an antenna or an antenna element may be a radiator, a feed, a ground plane, a feed line or any additional reflecting structure that forms function of the antenna.

Radiator may refer to a part of an antenna, which is normally made of electrically conductive material such as metal. Radiator of an antenna may carry accelerating changing electric and magnetic fields. This phenomena may be called electromagnetic radiation.

Antennas may have various types based on equipped radiators. For example, an antenna whose radiation mainly due to currents may be called current radiator antenna, such antenna includes e.g. dipole antenna, monopole antenna.

For another example, an antenna whose radiation mainly due to voltage difference to a ground plane of the antenna may be called voltage radiator antenna, such antenna includes e.g. patch antenna, aperture antenna.

An antenna feed or a feed element normally refers to a component of an antenna which excites in radio frequency, converts radio frequency currents to radio waves and provides the radio waves to the antenna. There may be one feed or more feeds for an antenna which might feed the radio waves to the rest of entire antenna structure. An antenna feed may also collect incoming radio waves so that the radio waves may be converted to electric currents for communications by a transmitter or receiver.

An antenna ground or a ground plane usually is a flat or substantially flat conducting surface to reflect the radio waves from other antenna elements. The antenna ground does not necessarily have to be connected to ground or earth. Size of an antenna ground may vary according to function requirements of the antenna. Usually a size of the conducting surface as a ground plane of an antenna is a quarter of the wavelength ($\lambda/4$) of the radio waves. An antenna ground plane may be formed by a metal material, a wire or the like.

An antenna feed line or a transmission line normally refers to a transmission structure that may connect the feed with a receiver or transmitter of a communication system that works with the antenna. The antenna feed line may have a characteristic impedance for transferring power which should be matched to impedance of the antenna and the communication system which works with the antenna.

The additional reflecting structures may form radio waves from the feed into a beam or other desired radiation pattern for the function of the antenna.

A polarization of an antenna is an important characteristic for the antenna. The polarization of an antenna may be determined by physical structure of the antenna and by its orientation. Mostly a polarization of an antenna refers to direction of an electric field of the antenna. Polarization may be predictable by designing an antenna's geometry arrangement. An antenna's linear polarization is generally along a direction of the antenna's currents if it is current radiator or along the direction of the voltage if it is voltage radiator.

For instance, a current radiator antenna which carries vertically oriented currents will transmit and receive radio waves in a vertical polarization. A current radiator antenna carries horizontally oriented currents will transmit and receive radio waves in a horizontal polarization.

For yet another instance, a voltage radiator antenna has vertically oriented voltage will transmit and receive radio waves in a vertical polarization. A voltage radiator antenna has horizontally oriented voltage will transmit and receive radio waves in a horizontal polarization.

An antenna aperture may refer to an effective area of an antenna. It may be a cross section defined as the effective area as a measure of how effective an antenna is at receiving power of radio waves.

An aperture antenna may have an aperture referring to a slot, opening, hole, or slit etc. in the structure configuration of the antenna.

FIG. 1 is a perspective view of an example device 100 equipped with a plurality of antennas in accordance with an embodiment of the present disclosure.

The device 100 may comprise a plurality of components such as a housing 101. The housing 101 may be manufactured from a conductive material, e.g. metal. Housing 101 may include a body frame 102. The body frame 102 may be a structural body that supports various components of a physical equipment. The body frame 102 may also work on defining extent of a construction with various components equipped with the body frame 102.

Housing 101 may be structured or shaped as an enclosure with a front face 103 to allow mounting of a screen 104 or the like. Interior space 105 within the enclosure of housing 101 may be arranged with multiple components of the device 100. For example, printed circuit board (PCB) 106 (not shown) may be affixed to frame 102 within the interior space 105. Processing circuitry 107 (not shown) such as one or more processors and/or logic circuits may be defined in or on the PCB 106.

A plurality of antennas may be configured for the device 100. FIG. 1 illustrates four antennas for the device 100 as an example, including a first antenna 111, a second antenna 113, a third antenna 115, and a fourth antenna 117. The processing circuitry 107 may be affixed to body frame 102. The plurality of antennas may be arranged in the body frame 102.

A first antenna 111 and a second antenna 113 may be arranged adjacent to each other in the body frame, the first antenna 111 and the second antenna 113 may be electrically coupled to the processing circuitry 107 to provide radiation, wherein the first antenna 111 and the second antenna 113 share a common ground defined by the body frame 102, wherein the first antenna 111 is configured to provide radiation of a first polarization, and wherein the second antenna 113 is configured to provide radiation of a second polarization substantially orthogonal to the first polarization to provide a signal isolation between the first antenna 111 and the second antenna 113.

The device 100 may be equipped with a chassis 108. Body frame 102 may also act as a chassis of device 100. The chassis 108 may act as a common ground for one or more antennas 111, 113, 115, and 117. The chassis 108 may be formed with a non-conductive material including e.g. glass, an elastomeric sheath, etc. A chassis may be a physical frame or structure that supports an object in its construction. A chassis may also provide protection for parts inside a body of the mobile device 100. PCB 106 and battery may be arranged on the chassis 108.

The device 100 may include a back cover 120 (not shown) as a battery cover, a protection cover for the device 100 etc. Back cover 120 may be formed by metal and may also be a part of an antenna.

Screen 104, back cover 120, chassis 108, PCB 106, as well as housing 101 may all be a part of an antenna system in the device 100. In some embodiments, the antenna system can be formed by a combination of multiple elements of the device 100 or based on only a single element of the device 100.

The disclosed antenna system does not require insulating material of structure as an antenna isolation element placed or interposed between two antenna elements to reduce the mutual coupling for a compact multi-antenna system for providing low mutual coupling. Such insulating material may require injecting additional insulating material within the antennas, such insulating material may include an elastomeric material, ceramic, mica, glass, plastic, metal oxide, air, etc.

The disclosed antenna system does not need to incorporate insulating structures to achieve insulation effects. Thus, the disclosed antenna system may be free from insulation structures such as an electromagnetic band gap (EBG) structure, a defect ground system (DGS), split ring resonators (SRRs), etc. The implementation of these types of structures often involves a large formation, which is less appealing to compact mobile devices.

Additionally, the disclosed antenna systems does not require a transmission line to connect to antenna ports. Out of phase signal to cancel the over-the-air coupling at designed frequency for antennas may be provided based on structural configurations of the disclosed antenna system with orthogonal polarizations between adjacent antennas. As a result, the disclosed antenna system can be implemented in a compact manner without the cost of extra space, e.g. space on a printed circuit board (PCB), to accommodate a neutralization line, which is rarely available inside a small sized mobile device.

FIG. 2 illustrates an example geometry structure of a slot antenna 200, for example, included in device 100 of FIG. 1. A geometry structure of an antenna may be characterized by a set of points, parts on a plane or in space, as well as shape and relative arrangement of the parts and points of the antenna.

The slot antenna 200 may include a metal surface 201, a slot 202, a feed 203 and a ground 204. The metal surface 201 may be a flat plate. One or more holes or slots may be cut out from the metal surface 201. The slots or holes may be included in a waveguide to provide radio waves. FIG. 2 illustrates an example of the slot 202 with the metal surface 201. Feed 203 may be defined along slot 202. Feed 203 may be excited directly by a voltage source or indirectly through coupling. When the metal surface 201 is driven as a slot antenna 200 by a driving frequency from the feed 203, the slot antenna 200 radiates electromagnetic waves. Thus the metal surface 201 also works as ground 204 for the slot antenna 200. Radiation pattern of the slot antenna 200 may be determined according to the shape and/or size of the slot 202 and the driving frequency.

A dotted line shows an aperture or slot 202 of the slot antenna 200. If voltage at edges 205 of the slot 202 (e.g. across the aperture 202) is zero, the voltage would be at a maximum at the center of the slot 202. The voltage may be in-phase along the entire effective aperture, the slot antenna 200 thus radiates. An electric field (E-field) thus may be vertical and line up across the slot antenna 200. Therefore polarization of the slot antenna 200 may be vertical and linear. An arrow 206 illustrates an example of a polarization direction for the slot antenna 200.

FIG. 3 illustrates an example geometry structure of an Inverted-F Antenna (IFA) 300. In some embodiments, device 100 of FIG. 1 may include an IFA antenna. An inverted-F antenna (IFA) is often used in wireless communication. The IFA 300 may include a ground plane 301 and grounded at an end 302. An upper arm or leg 303 of the IFA 300 may be shorted to the ground plane 301 at a shorting pin 304. A length of the upper arm 303 may be a quarter of a wavelength. At a point with a distance from the grounded end 302, from the ground plane 301 to the upper arm 303 of the IFA 300, a feed 305 is provided for the IFA 300. The feed 305 may be arranged closer to the shorting pin 304 than to an open end of the upper arm 303.

The IF A 300 may be a wire antenna and may also be classified as an aperture antenna. A dotted line shown in FIG. 3 illustrates an effective aperture 306 of the IFA 300. A structure of the IFA 300 may resemble an inverted letter "F", and such type of IF A 300 may be called "Inverted F Antenna".

An arrow 307 represents direction of the polarization of the IFA 300 antenna. The polarization of the IFA 300 may be vertical, and a radiation pattern may be roughly donut shaped, with an axis of the donut in the vertical direction.

FIG. 4 illustrates an antenna system 400 comprising two adjacent antennas according to an embodiment of the present disclosure. The antenna system 400 may be utilized in a compact device such as device 100 in FIG. 1. The antenna system 400 may be configured along a side of the body (e.g. one of six sides of a thin cuboid like shape enclosure) of the device 100. The two adjacent antennas can be slot antennas as shown for example by FIG. 2, or IFA antennas as shown for example by FIG. 3, or a combination of a slot antenna and a IFA antenna as shown in FIG. 4. Adjacent antennas in device 100 may be affixed or defined within body frame 102 or housing 101 without any insulating physical material or other device components arranged in between.

Processing circuitry 107 may be affixed to body frame 102. The plurality of antennas may be arranged in the body frame 102.

Antennas 401, 402 may be arranged adjacent to each other in the body frame, and antennas 401, 402 may be electrically coupled to the processing circuitry 107 to provide radiation. Antennas 401, 402 share a common ground defined by the body frame 102, where the antenna 401 is configured to provide radiation of a first polarization, and antenna 402 is configured to provide radiation of a second polarization substantially orthogonal to the first polarization, to provide a signal isolation between antennas 401, 402.

Adjacent antennas refer to antennas that are positioned immediately next to each other in close proximity within a device. Adjacent antennas may also refer to antennas with a distance that one antenna is in the reactive near-field coupling zone of another antenna's radius of roughly $\lambda/2\pi$ ($\lambda$ means length of a wavelength as referenced above). The near-field coupling zone may be dominated in a mutual coupling between the two adjacent antennas. The antennas 401, 402 may be arranged inside a compact space of a body of the device 100.

Antennas 401, 402 may reside adjacently to a wall as a portion of a housing, such as housing 101 of FIG. 1. The housing may house, e.g. mounted therein, a PCB with various components. The PCB may include a transceiver positioned at a portion of the housing. It should be noted that, in the context of the present disclosure, "electrical communication" may refer to any direct coupling and/or indirect coupling. Indirect coupling may refer to a coupling system with one or more electrical components positioned in between.

The antenna system 400 may comprise two or more antennas and the antennas that are adjacent to each other, whose voltage or currents orientation is orthogonal or close to orthogonal to each other.

The antenna system 400 may be configured for a mobile device, such as device 100 of FIG. 1. The antenna system 400 may include a first antenna element and a second antenna element which are formed using a common ground, with each antenna element configured to operate at a given communication frequency, at least one of the first antenna element and the second antenna element is a multiple input and multiple output (MIMO) antenna; the first antenna element configured to provide radiation of a first polarization; the second antenna element configured to provide radiation of a second polarization distinct from the first polarization; the first antenna element and the second antenna element configured to locate in close proximity on a mounting frame of the mobile device; and the first polarization is substantially orthogonal to the second polarization to provide a signal isolation between the first antenna element and the second antenna element.

Optionally, in any of the preceding embodiments, wherein the first antenna 401 is configured with a grounding leg connected to the common ground 420, and the grounding leg is configured to provide grounding support for the second antenna 402.

Optionally, in any of the preceding embodiments, wherein a part of the body frame 102, 404, 414 is defined for the common ground 420, and wherein the first antenna 401 is configured with an aperture 406 formed by the part of the body frame 102.

Optionally, in any of the preceding embodiments, wherein a part of the body frame 102 is defined for the common ground 420, wherein the first antenna is configured with a first aperture 406, and part of the first aperture 406 is formed by the part of the body frame 102.

Optionally, in any of the preceding embodiments, wherein the second antenna 402 is configured with an aperture (not shown) formed by the part of the body frame.

Optionally, in any of the preceding embodiments, wherein the second antenna 402 is configured with a second aperture, and part of the second aperture is formed by the part of the body frame 102.

Optionally, in any of the preceding embodiments, wherein a part of the body frame 102 is defined for the common ground 420, wherein the first antenna 401 is configured with a first aperture 406, and part of the first aperture 406 is formed by the part of the body frame 102, the second antenna 402 is configured with a second aperture, and part of the second aperture is formed by the part of the body frame 102, and wherein the first aperture 406 and the second aperture are distinct from each other.

Optionally, in any of the preceding embodiments, wherein the part of the body frame 102 is defined to separate respective apertures for the first antenna 401 and the second antenna 402.

Optionally, in any of the preceding embodiments, wherein the first antenna 401 and the second antenna 402 are formed with separate apertures arranged as being substantially coplanar.

Optionally, in any of the preceding embodiments, wherein the body frame 102 comprises a printed circuit board 106, an integrated chip, a circuit card, a configuration card, a desk top device chassis, a lap top device chassis, a set top device chassis 108, a back cover 120 or a hand held device chassis 108.

The polarization of the two antennas 401, 402 in antenna system 400 may be substantially orthogonal. Comparing to each other, the design of antenna 401 is mainly horizontally polarized and the design of antenna 402 is mainly vertically polarized. Alternatively the polarization of the two antennas 401, 402 are close to orthogonal to each other. A plurality of arrows illustrated in FIG. 4 represent the direction of polarization of the two antennas. Aperture antennas such as slot antenna or IFA antenna may utilize a metal frame (not shown) or a cover chassis (not shown) or any mechanical parts (not shown) of the device 100, by inserting a voltage radiator to the metal frame or the cover chassis to have a voltage orientation or a current orientation.

In one embodiment, antenna 401 can represent a slot antenna, which may have a feed 403 and a ground 404. The feed 403 and the ground 404 may be integrally coupled to an inner surface of a wall of the device 100 and extend inwardly therefrom the wall.

A supporting circuitry 405 (not shown by FIG. 4) such as a transceiver may be electrically coupled to the feed 403. The feed 403 may be in electrical communication with the supporting circuitry 405 via a wire, clip, or any other conductive material.

During signal transmission, current may flow from the feed 403, through a plurality of other elements of the antenna 401, and then to the ground 404 to radiate RF signals. During signal receiving, RF signals may be detected by the antenna 401, corresponding generated current may flow to the feed 403, and the supporting circuitry 405 may be fed for demodulation.

The radiators (not shown) of antennas 401 and 402 may share a same ground. For example, an arm or leg element 415 of antenna 402 can be shorted to the ground 404 via a common ground 420 of both antennas 401 and 402. A dotted line represents a geometric aspects of aperture 406 for antenna 401.

In one embodiment, antenna 402 can represent an IFA antenna, which may comprise a feed 413, a body frame 414 may also work as a ground and an open end leg or arm 415 situated along the antenna 402. The feed 413 is formed closer to a center of a portion of a housing for antenna 402 than to boundary portion of the housing. By virtue of a larger surface area as such comparing to antenna 401, RF signals with longer wavelengths for antenna 402 may be more easily propagated.

In one embodiment, the slot antenna 401 and the IFA antenna 402 may share a common ground 420 by being grounded to a same ground plane, or to a same element in the housing. The element may be a camera or any other elements. Optionally, other grounding techniques may be contemplated such as grounding to a same PCB or any other components mounted thereon.

In certain embodiments, when two antennas are far away from each other, or when one antenna is vertically polarized and the other is horizontally polarized comparatively, i.e. when the two antennas are orthogonal to each other, there is substantially no electromagnetic interaction between them. When the two antennas are drown closer e.g. one antenna is arranged within a reactive near-field zone of radius of roughly 0.15λ, of another antenna, the isolation results still can fulfill strict requirements of communication by mobile devices. Comparing to similar type of antennas with similar distance apart from each other, the isolation result is much more improved by applying the embodiment of present disclosure.

Figure 5A:
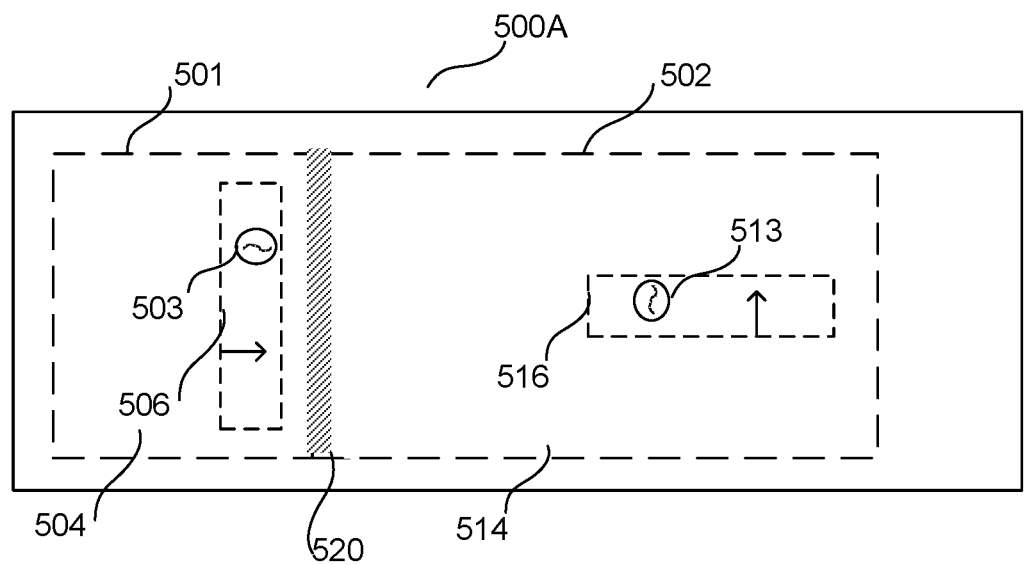
FIGS. 5A and 5B illustrates antenna systems 500, 500' each comprising two adjacent antennas according to an embodiment of the present disclosure.
Figure 5B:
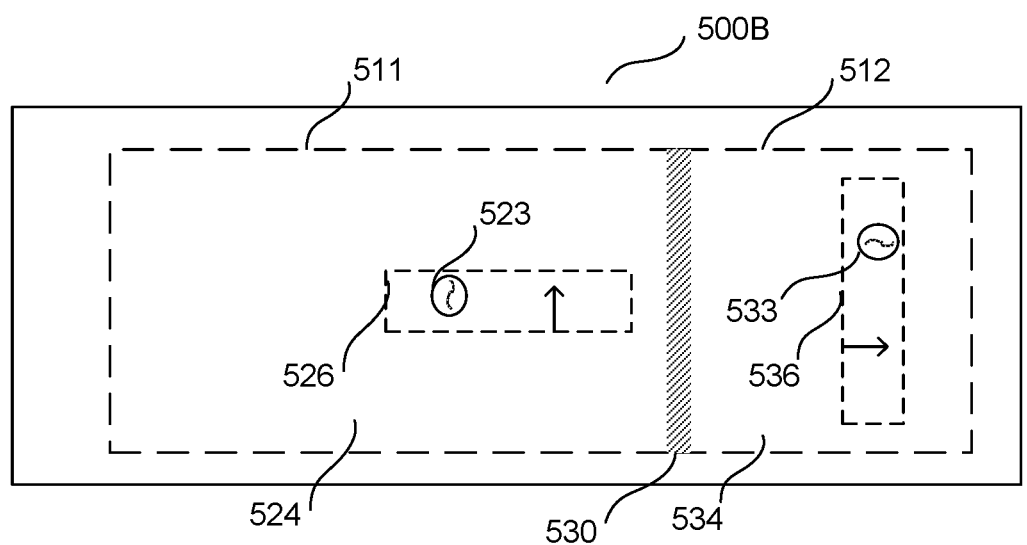

FIGS. 5A and 5B illustrate antenna systems 500A, 500B each comprising two adjacent antennas according to an embodiment of the present disclosure.

The antenna system 500A includes two antennas 501, 502. The antennas may have similar or different sizes. The two antennas in antenna system 500 are arranged adjacent to each other, whose voltage or currents orientation is orthogonal or close to orthogonal to each other. In some embodiment, an antenna system may consist of two antennas.

Respectively, the antenna 501, 502 may have a feed 503, 513 and a ground 504, 514; the feed and the ground may be integrally coupled to an inner surface of a wall of the device 100 and extend inwardly therefrom the wall. Alternatively, the feed 503, 513 may directly feed the structure of the antennas 501, 502.

The radiators (not shown) of antennas 501 and 502 share a same ground. For example, a common ground 520 is illustrated as an element of antenna 501 and also as a part of the ground 514 for antenna 502. A dotted line represents an effective aperture 506 for antenna 501, an effective aperture 516 for antenna 502.

Similarly, the antenna system 500B may include two antennas 511, 512. The antennas 511, 512 may have similar or different sizes. The two antennas 511, 512 are arranged adjacent to each other, whose voltage or currents orientation is orthogonal or close to orthogonal to each other.

Respectively, the antenna 511, 512 may have a feed 523, 533 and a ground 524, 534; the feed and the ground may be integrally coupled to an inner surface of a wall of the device 100 and extend inwardly therefrom the wall. Alternatively, the feed 523, 533 may directly feed structure of the antennas 511, 512.

The radiators (not shown) of antennas 511 and 512 share a same ground. For example, a common ground 530 is shown to illustrate an element of antenna 511 as a part of the ground 534 for antenna 512. A dotted line represents an aperture 526 for antenna 511, an aperture 536 for antenna 512.

Figure 6A:
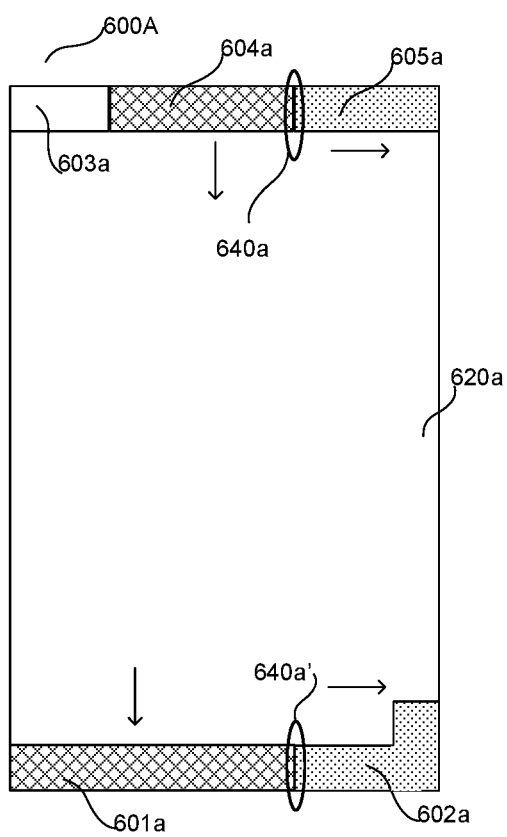
FIGS. 6A, 6B and 6C illustrate respectively an antenna system 600 for a mobile device e.g. the device 100 according to an embodiment of the present disclosure.
Figure 6B:
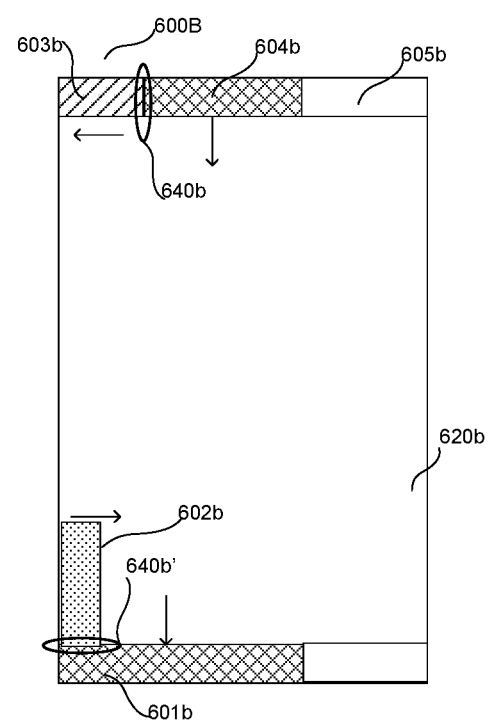
Figure 6C:
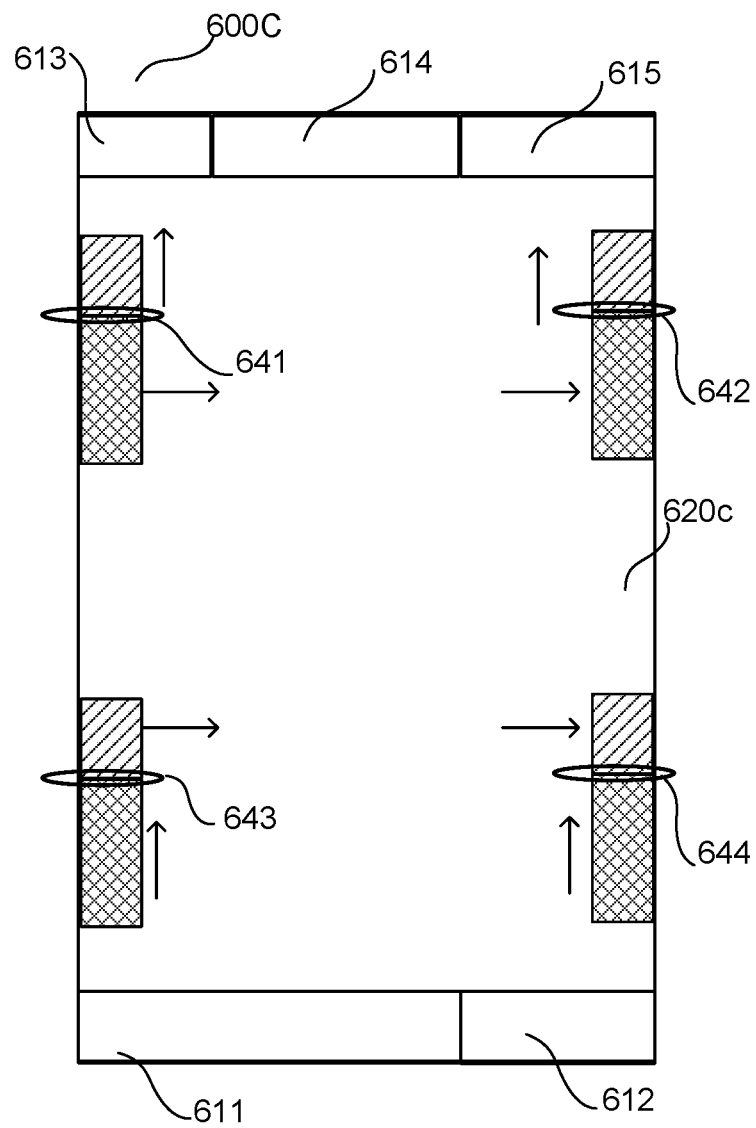

FIGS. 6A, 6B and 6C illustrate respectively an antenna system 600A, 600B, and 600C for a mobile device e.g. the device 100 according to an embodiment of the present disclosure.

Each antenna system 600A, 600B, 600C can comprise a plurality of antennas for a mobile device. Among the plurality of antennas, there is at least one MIMO antenna. The plurality of antennas may be configured at an edge side of the mobile device. Respective groups of antennas may be located along every edge side of the mobile device. On each edge side there may be not more than two antennas that are arranged as adjacent antennas, with which the polarization of the two antennas are configured orthogonally. The two adjacent antennas which are configured on the same edge side of the mobile device may share a common ground.

Each housing 620a, 620b, 620c may be a static housing or a plurality of layers of circuit boards in a housing which can be utilized by various kinds of mobile devices, such as device 100 of FIG. 1. Each housing 620a, 620b, or 620c may include one or more PCBs 621 (not shown) on which a plurality of circuitry 622 (not shown) for communication may be mounted. The plurality of circuitry may include a processor, a memory, a user interface and other elements etc., such as in device 100 of FIG. 1.

Each antenna system 600A, 600B, 600C may be configured inside respective housing 620a, 620b, 620c or utilizing part of the housing, for example, along an edge of the respective housing 620a, 620b, 620c. Preferably, the antenna system can be configured to occupy minimum space required in the housing and along an edge side of the housing. Adjacent antennas are configured with orthogonal polarizations or substantially orthogonal polarizations to each other. The antenna system may include a plurality of groups of antennas positioned along different edge side of the housing.

A plurality of arrows illustrated in FIGS. 6A, 6B and 6C represent an example direction of polarization of two adjacent antennas.

An example embodiment includes a mobile device comprising a body frame; processing circuitry affixed to the body frame; a plurality of groups of antennas with each group comprising a respective pair of antennas arranged adjacent to each other in the body frame; wherein the respective pair of antennas include a first antenna and a second antenna electrically coupled to the processing circuitry to provide radiation, wherein the first antenna and the second antenna share a common ground defined by the body frame, wherein the first antenna is configured to provide radiation of a first polarization, and wherein the second antenna is configured to provide radiation of a second polarization substantially orthogonal to the first polarization to provide a signal isolation between the first antenna and the second antenna.

Optionally, in any of the preceding embodiments, wherein the first antenna is configured with a grounding leg connected to the common ground, and the grounding leg is configured to provide grounding support for the second antenna.

Optionally, in any of the preceding embodiments, wherein a part of the body frame is defined for the common ground, and wherein the first antenna is configured with an aperture formed by the part of the body frame.

Optionally, in any of the preceding embodiments, wherein the second antenna is configured with an aperture formed by the part of the body frame.

Optionally, in any of the preceding embodiments, wherein a part of the body frame is defined for the common ground, wherein the first antenna is configured with a first aperture, and part of the first aperture is formed by the part of the body frame, the second antenna is configured with a second aperture, and part of the second aperture is formed by the part of the body frame, and wherein the first aperture and the second aperture are distinct from each other.

Optionally, in any of the preceding embodiments, wherein the part of the body frame is defined to separate respective apertures for the first antenna and the second antenna.

Optionally, in any of the preceding embodiments, wherein the first antenna and the second antenna are formed with separate apertures arranged as being substantially coplanar.

Optionally, in any of the preceding embodiments, wherein the body frame comprises a printed circuit board, an integrated chip, a circuit card, a configuration card, a desk top device chassis, a lap top device chassis, a set top device chassis, a back cover or a hand held device chassis.

Optionally, in any of the preceding embodiments, wherein at least one group of antennas comprises a multiple input and multiple output (MIMO) antenna.

Optionally, in any of the preceding embodiments, wherein no more than one group comprising the respective pair of antennas being adjacent to each other is arranged on a same edge side of the body frame.

FIG. 6A illustrates a perspective view of an example device 100 equipped with a 4×4 MIMO antenna of the antenna system 600A in accordance with an embodiment of the present disclosure.

For example there are at least five antennas that are equipped for the device 100 according to FIG. 6A.

Antenna 601a may be equipped as a cellular main antenna with frequencies 699-960 MHz, and 1710-2700 MHz.

Antenna 602a may be equipped as a MIMO antenna with frequency 1930-2360 MHz.

Antenna 603a may be equipped as another MIMO antenna with frequency 1930-2360 MHz, as well as a GPS antenna with frequency 1575-1620 MHz.

Antenna 604a may be equipped as a cellular division antenna with frequency 729-960 MHz, 1710-2700 MHz.

Antenna 605a may be equipped as a WIFI antenna with frequency 2.4/2.5 GHz.

Antennas 601a and 602a may be positioned at an edge side at a lower section of the housing 620a. The radiators (not shown) of antennas 601a and 602a may share a common ground 640a'. For example, common ground 640a may be configured as a grounding arm or leg of antenna 602a as well as the ground of antenna 601a. The polarizations of the two antennas 601a, 602a may be substantially orthogonal to each other. In one embodiment, antenna 601 may be designed with horizontal polarization and t antenna 602a with vertical polarization, or vice versa.

Antennas 604a and 605a may be positioned at a same edge side at an upper section of the housing 620a. The radiators (not shown) of antennas 604a and 605a may share a common ground 640a. For example, common ground 640a may be configured as a grounding arm or leg of antenna 605a and the ground of antenna 604a. The grounding leg of antenna 605a can be configured to provide grounding support for antenna 604a. The polarizations of the antennas 604a, 605a can be (substantially) orthogonal. In certain embodiments, antenna 604a can be designed with vertical polarization and antenna 605a with horizontal polarization, or vice versa.

FIG. 6B illustrates a perspective view of an example device, such as device 100 of FIG. 1, with a 4×4 MIMO antenna of the antenna system 600B in accordance with an embodiment of the present disclosure.

Two adjacent antennas, a first member antenna and a second member antenna, may form a group of orthogonal polarized antennas. The polarizations of the two adjacent antennas can be substantially orthogonal. The first member antenna can be designed with horizontal polarization and the second antenna with vertical polarization, or vice versa. When the first member antenna is a member antenna for a second group of two orthogonal polarization antennas, including the first member antenna and a third member antenna, the polarization of the third member antenna may be configured with the same direction as with the second member antenna.

For example, antenna 603b is adjacent to antenna 604b, antenna 604b is adjacent to antenna 605b.

Antenna 603b and adjacent antenna 604b may form a first group of two orthogonal polarization antennas. The polarizations of the two antennas 603b, 604b are orthogonal or close to orthogonal to each other. Antenna 603b can be designed with horizontal polarization and antenna 604b with vertical polarization, or vice versa.

If antenna 604b is a member antenna for a second group of two orthogonal polarization antennas 604b, 605b, the polarization of antenna 605b may be configured with the same direction as with antenna 603b.

FIG. 6C illustrates a perspective view of an example device 100 equipped with an 8×8 MIMO antenna of the antenna system 600C in accordance with an embodiment of the present disclosure.

The 8×8 MIMO antenna for example provides a band with frequency of 3550-3700 MHz.

In one embodiment, antenna 611 can be configured as a cellular main antenna, antenna 612 as a MIMO antenna, antenna 613 as another MIMO antenna as well as a GPS antenna 614 as a cellular division antenna, and antenna 615 as a WIFI antenna.

Antenna system 600C may include four pairs of mutually orthogonally polarized antennas. Each pair of antennas may comprise a slot antenna and an IFA antenna, or two slot antennas or two IFA antennas or any other types of antennas. Each pair of antennas are configured with polarization directions orthogonal to each other. A common ground is shared by each pair of antennas. For example, a grounding arm or leg of a first antenna may be configured a part of the ground of a second antenna in a same pair of antennas. The mutually orthogonally polarized antennas may be arranged by various size or shape of the pairs of antennas.

A simulation can illustrate the improvements in antenna performance within a limited space as shown in examples of the present disclosure to a mobile phone. The simulation can be carried out under 2000-2200 MHz which is used for receiving spectrum of LTE B1 and B4 frequency bands. The isolation level for two antennas adjacent to each other with a close proximity has shown a considerable change from −7 dB to −14.6 dB. This simulation result demonstrates a low mutual coupling effect considering the close proximity distance between the adjacent two antennas.

Figure 7:
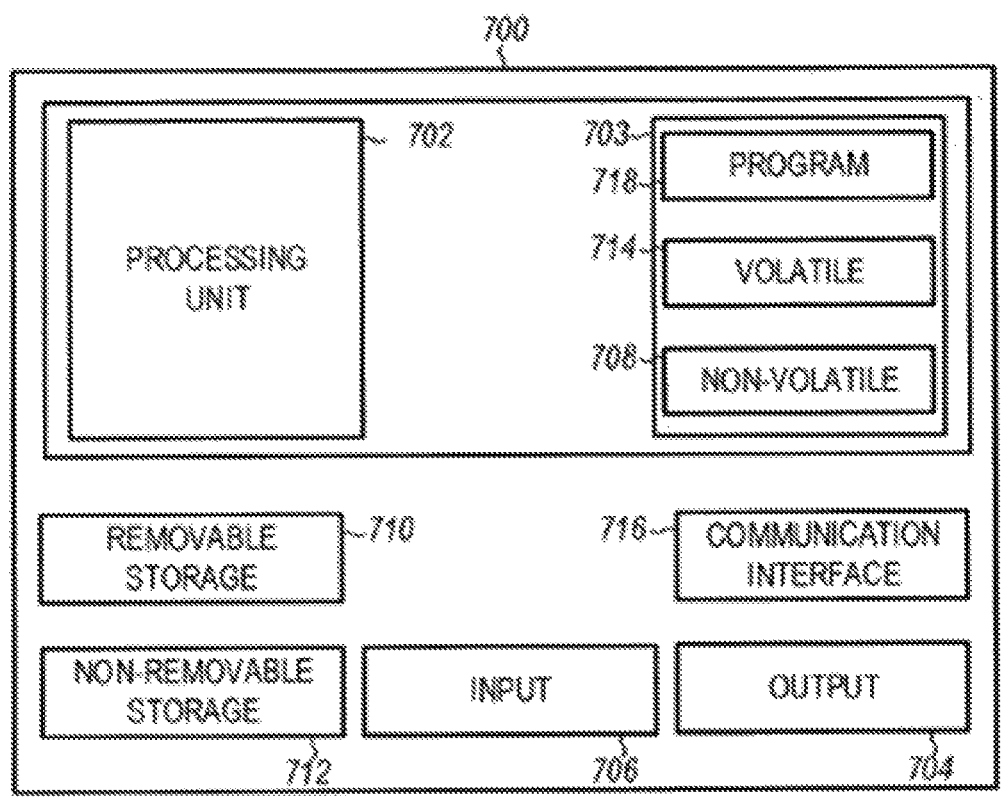
FIG. 7 is a block diagram illustrating circuitry for implementing a mobile device, such as mobile phone having antennas as described according to an embodiment of the present disclosure.

FIG. 7 is a block diagram illustrating circuitry for implementing a mobile device, such as mobile phone having antennas as described according to an embodiment of the present disclosure. All components need not be used in various embodiments. For example, mobile phone may not need not have disk type storage devices.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smart watch, or other computing device including the same or similar elements as illustrated and described with regard to FIG. 7. Devices, such as smartphones, tablets, and smart watches, are generally collectively referred to as mobile devices or user equipment. Further, although the various data storage elements are illustrated as part of the computer 700, the storage may also or alternatively include cloud-based storage accessible via a network, such as the Internet or server based storage.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input 706, output 704, and a communication connection 716. Output 704 may include a display device, such as a touchscreen, that also may serve as an input device. The input 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 702 of the computer 700. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage such as a storage area network (SAN) indicated at 720.

It should be strongly noted that any illustrated size and location of an element inside a mobile device as described in the present disclosure is purely illustrative in that any reconfiguration as of such is contemplated.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A mobile device comprising:
a housing including a body frame, the body frame configured to structurally support a plurality of components of the mobile device;
processing circuitry affixed to the body frame;
a first antenna with a first radiating structure coupled to a first feed line via a first feed element, wherein the first antenna comprises a first end and a second end, the second end disposed along a first side of a grounding structure defined by a portion of the body frame, the first radiating structure is configured with an aperture, the first feed element disposed within a first internal volume of the body frame formed by the aperture; and
a second antenna with a second radiating structure coupled to a second feed line via a second feed element, the second antenna comprising an open end and a grounded end, wherein the first antenna and the second antenna are electrically coupled to the processing circuitry to provide signal radiation via the first radiating structure and the second radiating structure respectively, the grounded end disposed along a second side of the grounding structure, the first side of the grounding structure being opposite the second side of the grounding structure, wherein the first antenna and the second antenna share the grounding structure, and the grounding structure is configured to extend in an orthogonal direction out of a plane including the aperture, wherein the first radiating structure of the first antenna provides signal radiation of a first polarization, and wherein the second radiating structure of the second antenna provides signal radiation of a second polarization, the second polarization being distinct from the first polarization.

2. The mobile device of claim 1, wherein the first antenna is a slot antenna and the second antenna is an inverted-F antenna.

3. The mobile device of claim 1, wherein the grounding structure is distinct from the first radiating structure and the second radiating structure.

4. The mobile device of claim 3, wherein the second feed element is disposed within a second internal volume of the body frame.

5. The mobile device of claim 1, wherein the second antenna is an inverted-F antenna, and wherein the second feed element is disposed between the grounded end and the open end.

6. The mobile device of claim 1, wherein the portion of the body frame is defined for the grounding structure.

7. The mobile device of claim 1, wherein the body frame comprises at least one of:
a desktop device chassis;
a laptop device chassis;
a set-top box device chassis; and
a back cover or a handheld device chassis.

8. The mobile device of claim 1, wherein the first antenna is arranged within a radius of $\lambda/2$ of the second antenna forming a reactive near-field coupling zone, wherein $\lambda$ is a wavelength of signals transmitted by the second antenna.

9. A mobile device comprising:
a housing including a body frame, the body frame configured to structurally support a plurality of components of the mobile device;
processing circuitry affixed to the body frame; and
a plurality of groups of antennas with each group of antennas of the plurality of groups of antennas comprising a respective pair of antennas arranged adjacent to each other in the body frame;
wherein the respective pair of antennas include a first antenna and a second antenna, the first antenna comprising a first end and a second end, the second end disposed along a first side of a grounding structure defined by a portion of the body frame, the first antenna further comprising a first ground, ground, a first radiating structure coupled to a first feed line via a first feed element, the first radiating structure configured with an aperture, the first feed element disposed within a first internal volume of the body frame formed by the aperture, the second antenna comprising an open end and a grounded end, the second antenna further comprising a second radiating structure coupled to a second feed line via a second feed element, the first antenna and the second antenna electrically coupled to the processing circuitry to provide signal radiation via the first radiating structure and the second radiating structure respectively,
wherein the first antenna and the second antenna share the grounding structure, wherein the grounding structure is configured to extend in an orthogonal direction out of a plane including the aperture, and wherein the grounded end disposed along a second side of the grounding structure, the first side of the grounding structure being opposite the second side of the grounding structure.

10. The mobile device of claim 9, wherein the first antenna is a slot antenna and the second antenna is an inverted-F antenna.

11. The mobile device of claim 9, wherein the portion of the body frame is defined for the grounding structure.

12. The mobile device of claim 11, wherein the second antenna is an inverted-F antenna, and wherein the second feed element is disposed between the grounded end and the open end.

13. The mobile device of claim 9, wherein the aperture and the grounded end are arranged on opposite sides of the grounding structure as being substantially coplanar.

14. The mobile device of claim 9, wherein the body frame comprises at least one of:
a printed circuit board, an integrated chip, a circuit card, a configuration card, a desktop device chassis, a laptop device chassis, a set-top box device chassis, a back cover, or a handheld device chassis.

15. The mobile device of claim 9, wherein at least one group of antennas of the plurality of groups of antennas comprises a multiple input and multiple output (MIMO) antenna.

16. The mobile device of claim 9, wherein no more than one group of antennas of the plurality of groups of antennas comprising the respective pair of antennas being adjacent to each other is arranged on a same edge side of the body frame.

17. The mobile device of claim 9, wherein the first antenna is arranged within a radius of $\lambda/2$ of the second antenna forming a reactive near-field coupling zone, wherein $\lambda$ is a wavelength of signals transmitted by the second antenna.

* * * * *

UNITED STATES PATENT AND TRADEMARK OFFICE
CERTIFICATE OF CORRECTION

PATENT NO. : 11,552,391 B2
APPLICATION NO. : 15/868958
DATED : January 10, 2023
INVENTOR(S) : Wei Huang It is certified that error appears in the above-identified patent and that said Letters Patent is hereby corrected as shown below:

In the Claims

In Column 15, Line 43, in Claim 9, after "comprising", delete "a first ground, ground,"

Signed and Sealed this
Twenty-first Day of March, 2023

Katherine Kelly Vidal
*Director of the United States Patent and Trademark Office*